May 17, 1966 J. E. RAIDEL 3,251,608
TANDEM SUSPENSIONS
Filed Oct. 28, 1963 5 Sheets-Sheet 3

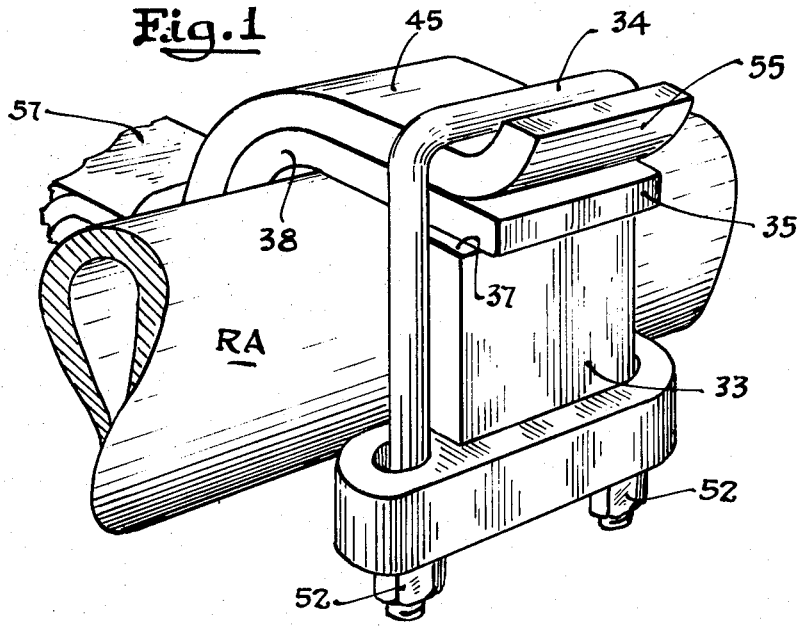
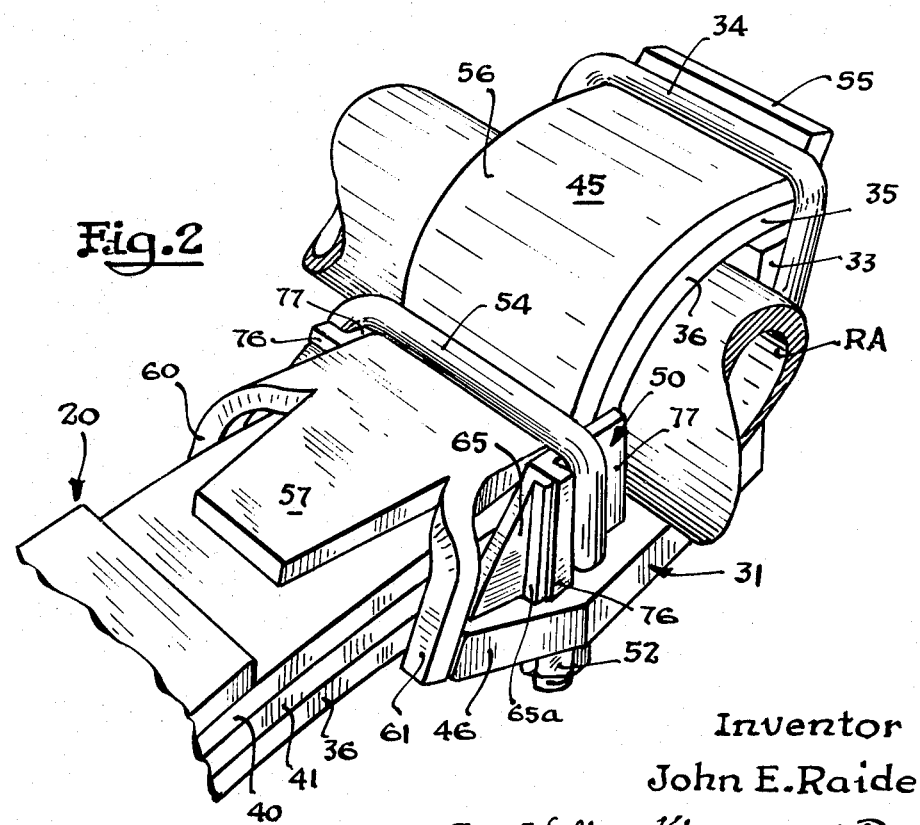

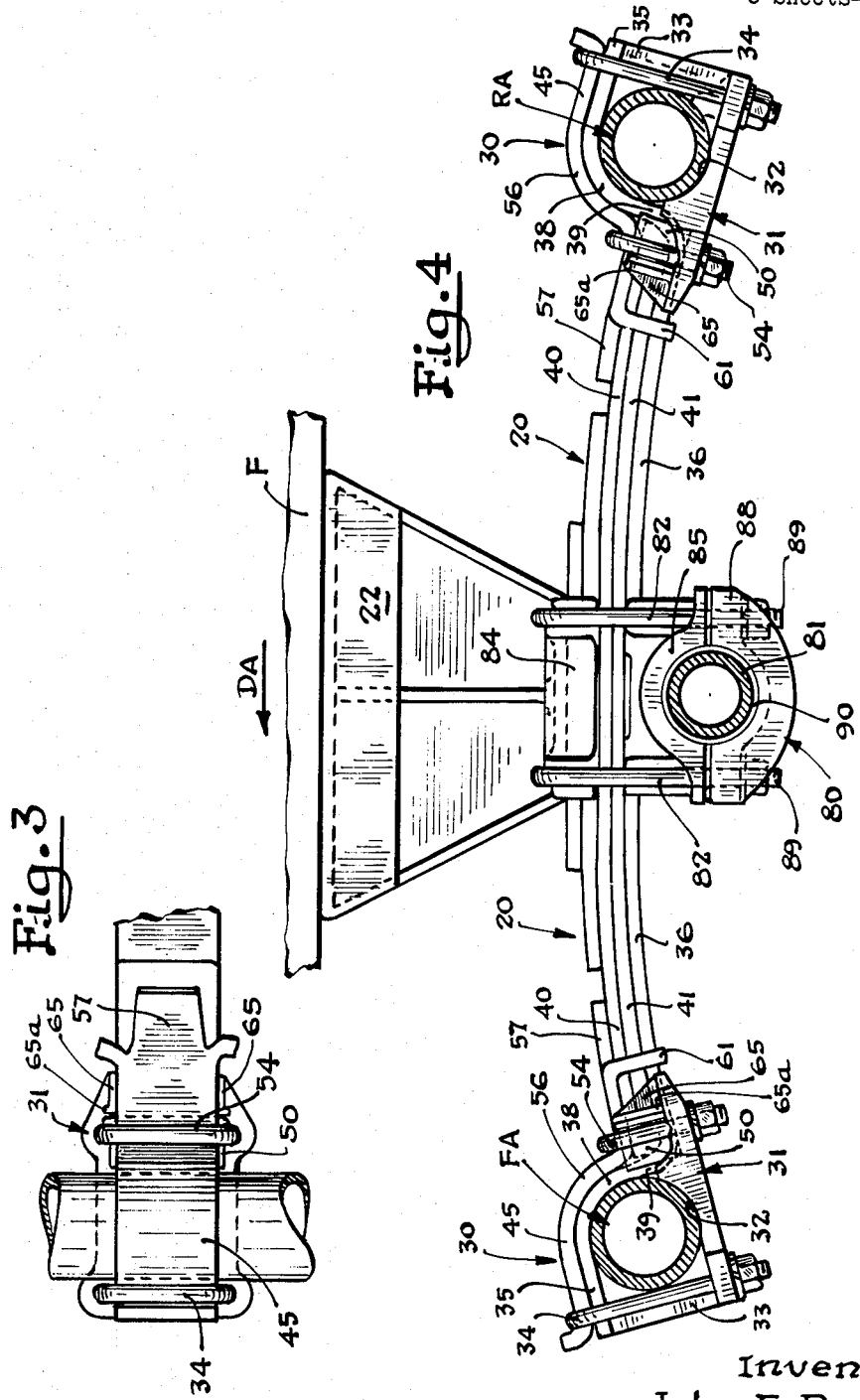

Inventor
John E. Raidel
By Wallace, Kinzer and Dorn
Attorneys

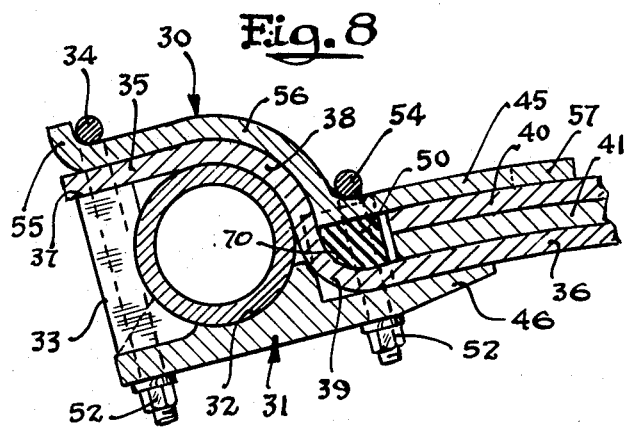
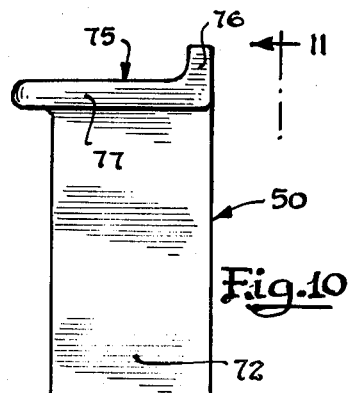
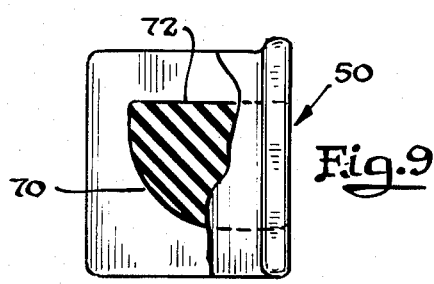
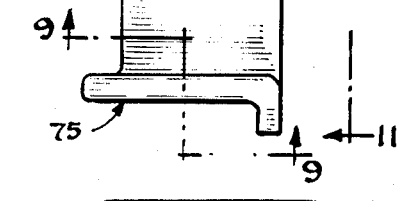
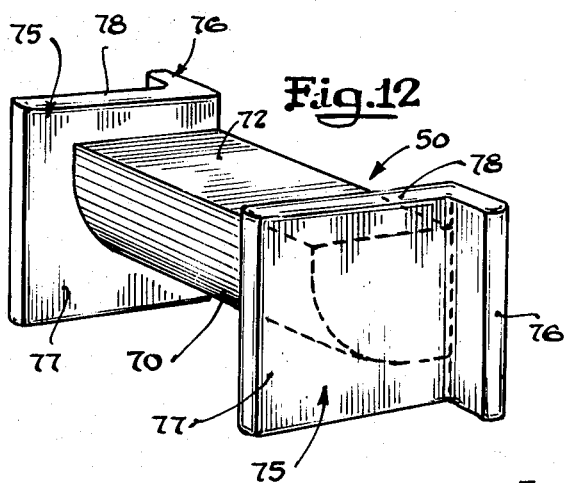
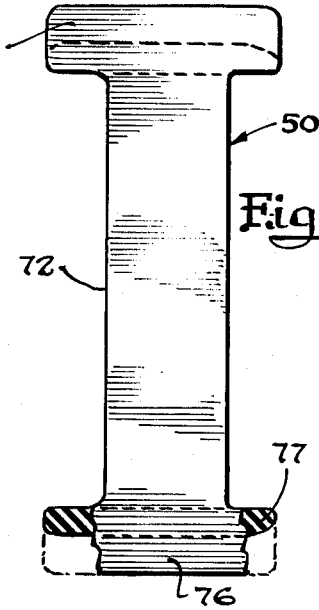
Inventor
John E. Raidel
By Wallace, Kinzer and Dom
Attorneys May 17, 1966  J. E. RAIDEL  3,251,608
TANDEM SUSPENSIONS
Filed Oct. 28, 1963  5 Sheets-Sheet 5
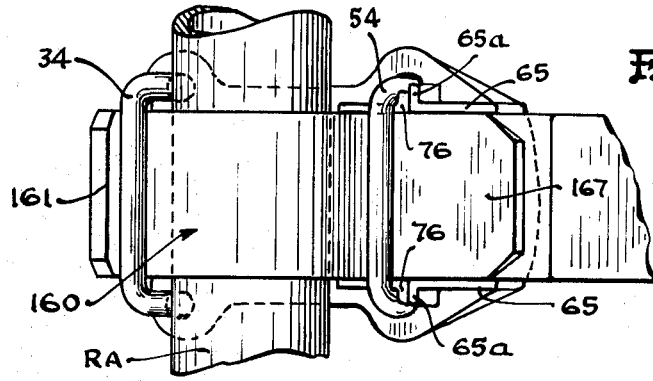
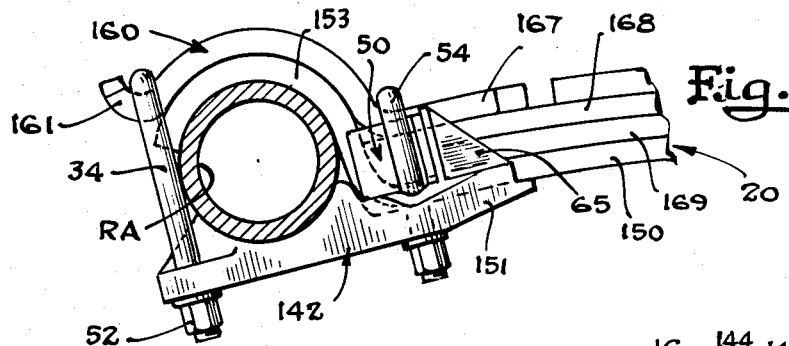
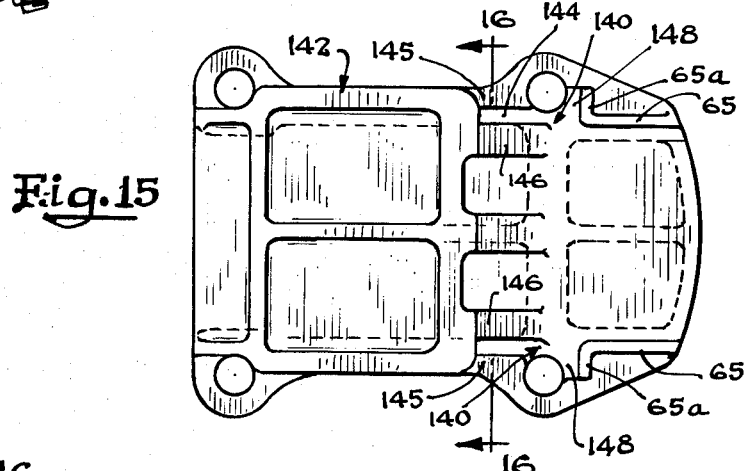
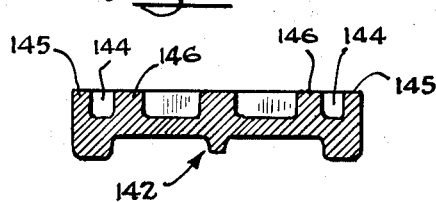
Inventor
John E. Raidel
By Wallace, Kinzer and Dorn
Attorneys

United States Patent Office 3,251,608
Patented May 17, 1966

3,251,608
TANDEM SUSPENSIONS
John E. Raidel, 2306 Sunset Drive, Springfield, Mo.
Filed Oct. 28, 1963, Ser. No. 319,280
12 Claims. (Cl. 280—104.5)

This invention relates to a tandem suspension for a tandem axle vehicle, and more particularly to a tandem suspension for heavy trucks or trailers of the type used in cross-country transportation.

In suspensions for tandem axles of the heavy duty type, it is desirable that the suspension be of such nature that a heavy load imposed on one axle will be in part distributed or equalized with respect to the other axle, while enabling a great deal of articulation to be accomplished in the course of such articulation or equalization. The primary object of the invention is to construct a novel heavy duty suspension having the characteristics set forth above as desirable in this type of suspension.

The present invention is an improvement in a type of tandem suspension known commonly as a "two spring" or "single points" suspension wherein each of a pair of multi-leaf, semi-elliptical springs, one at each side of the truck or trailer has its respective ends affixed to each of a pair of tandem axles. The center portion of each multi-leaf spring is pivotally connected to a supporting bracket on the frame of a vehicle by means of a trunnion shaft. Thus, the vehicle load is imposed on the supporting bracket and the trunnion shaft and is transposed to the center portion of each of the springs and the load on the springs is resisted at the outer ends of the springs at their respective interconnections with the axles. It is desired that the axle be connected to the springs to resist the vehicle load while at the same time permitting relative movement of spring leaves caused by flexure of the spring, and accordingly an object of the present invention is to interconnect the ends of each of the multi-leaf springs to the axles to resist the load while permitting relative movement of the spring leaves of each multi-leaf spring caused by flexure of a spring as a whole.

In the present invention, and as a further object thereof, the axles of the tandem suspension are supported by a plurality of leaves of a multi-leaf spring; and these supporting leaves are permitted to slide relative to one another as the multi-leaf spring flexes as a whole. In accordance with a further object of the invention, the axles are connected to the opposite ends of the multi-leaf spring by a uniquely configured clamping means which serves to secure the axle to a plurality of the leaves of a multi-leaf spring while permitting the shorter supporting leaves freedom of relative movement on the flexure of the spring means as a whole due to the loads imposed on the respective axles.

The unique clamping means employs, as a still further object of the invention, an interlocking spacer block preventing undue compression on the supporting leaves of the multi-leaf spring that would bind the leaves together so that they are not able to flex according to their differing amounts of movement to their differing radii of curvature. A still further object of the invention is the confining of the supporting leaves of the multi-leaf spring in a clamping means against separation from each other and the axle supported thereby while permitting the leaves to slide within the clamping means.

Difficulties arise in the clamping of the axles to the ends of a leaf spring in that when the brakes are applied, the axles tend to impose a load upon the ends of the leaf spring which stresses and strains the ends of the leaf springs. In accordance with a further object of the invention, the uniquely shaped clamping plate is also a flexible member and is disposed to resist the flexure, stressing and straining of the ends of the leaf springs by acting as a spring that works counter to the load being applied by the axles to the ends of the leaf springs when the brakes are applied.

In accordance with a still further object of the invention, the clamping plate cooperates with a shackle having a spacer block thereon whereby when U-shaped clamps securing the clamping plate to the shackle are tightened, the clamping plate and the shackle are prevented from wrapping about the shorter auxiliary spring plates in order to permit lengthening and shortening of the leaves relative to each other. A still further object of the invention is the providing of the clamping plate with vertical extensions thereon for embracing the sides of a plurality of leaves of the multi-leaf spring so as to confine the leaves against sideways movement.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles Other embodiments of the invention embodying the same or equivalent principles may be used and structural changes may be made as desired by those skilled in the art without departing from the present invention and the purview of the appended claims.

In the drawings:

FIGS. 1 and 2 are front and rear perspective views of a clamping means for clamping a multi-leaf spring to an axle according to the preferred embodiment of the invention;

FIG. 3 is a plan view of a clamping means for clamping a multi-leaf spring to an axle according to the preferred embodiment of the invention;

FIG. 4 is a side elevational view showing a tandem suspension employing a multi-leaf spring according to the present invention;

FIG. 8 is a sectional view showing the clamping means according to the preferred embodiment of the invention;

FIG. 9 is a sectional view taken along a line 9—9 in the direction of the arrows showing a spacer block;

FIG. 10 is a plan view of the spacer block;

FIG. 11 is a view taken along the line 11—11 in the direction of the arrows in FIG. 10 showing the spacer block;

FIG. 12 is a perspective view of the spacer block;

FIG. 13 is a plan view of another embodiment of a clamping means for clamping a multi-leaf spring to an axle;

FIG. 14 is a side elevational view of the clamping means of FIG. 13;

FIG. 15 is a plan view of a shackle casting for the embodiment of FIG. 13; and

FIG. 16 is a sectional view taken along the lines 16—16 of FIG. 15 showing the shackle in section.

Figure 5:
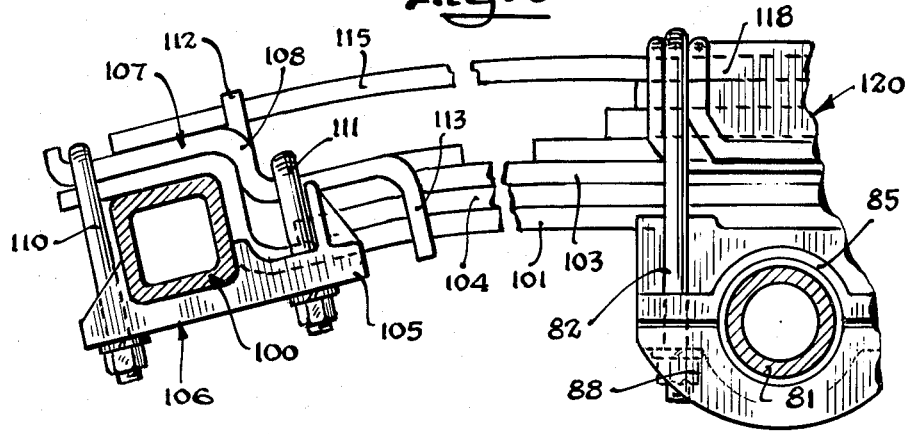
FIG. 5 is a side elevational view of clamping of a multi-leaf spring to a square shape axle according to a further embodiment of the invention.

Referring now to the drawings, and more particularly to FIG. 4, there is shown a tandem suspension, according to the preferred embodiment of the invention, wherein a single multi-leaf spring means 20 serves as a sole supporting means for each end of a pair of front and rear axles FA and RA, it being understood that the axles FA and RA extending across the trailer body are supported at their opposite ends by an identical multi-leaf spring means so that the axles FA and RA are supported by two spaced multi-leaf springs such as the multi-leaf spring 20. The axles FA and RA support the usual double wheels (not shown) at each end thereof, and the tandem suspension is secured to the frame F of a truck or trailer body (not shown) by trunnion supporting bracket 22, only one of which is shown in FIG. 4. Thus, the frame F of the trailer has on each of its opposite sides a trunnion supporting bracket supporting a multi-leaf spring means near the mid-point of a multi-leaf spring which spans between the two axles FA and RA on which are carried the wheels for supporting the truck.

In contrast to the single multi-leaf spring means 20 for supporting adjacent axles, the conventional tandem suspension employs on each side of the trailer frame F a pair of semi-elliptical springs which have their adjacent ends supported by a centrally disposed mounting bracket such as bracket 22 and their remote ends supported by additional front and rear brackets attached to the frame F. Additionally, the conventional tandem suspension employs torque arms to hold the axles in aligned positions. In the tandem suspension of the present invention, the torque arms have been eliminated and the axles FA and RA are held in aligned positions on the ends of a single multi-leaf spring means 20 by a unique axle attachment device or clamping means 30.

Each of the axle attachment devices 30 has a shackle or seat 31 with a curved seat portion 32 in which is seated an axle FA or RA. In the preferred embodiment of FIGS. 1, 2 and 4, the shackle 31 has an upstanding plate 33 disposed outwardly of its respectively curved seat portion 32. The upstanding plate 33 extends upwardly from curved seat portion 32 to approximately the top of its supported axle FA or RA. The upstanding plate 33 terminates in a flat end wall or surface against which is clamped an end portion 35 of the longest leaf 36 of the multi-leaf spring means 20. As best seen in FIGS. 4 and 8, the longest leaf 36 of the multi-leaf spring means 20 has its end portions bent upwardly at a curved portion 39 and then outwardly at a reversely curved portion 38. The curved portions 38 of the springs 36 have radii of curvature substantially equal to the radius of curvature of the associated axle FA or RA. The curved portion 38 leads to a flat end portion 35 which overlies the top of the axle and which is clamped against the surface 37 of the plate 33. Thus, it will be seen that the longest leaf of the spring assembly has the outer end thereof deformed to engage complementally at least a portion of the related axle.

In accordance with the present invention, the axles FA and RA are not only supported by the longest leaf 36 but also are supported by shorter leaves 40 and 41, FIG. 8, of the multi-leaf spring means 20. Specifically, the end portions of the leaf springs 40 and 41 terminate short of an associated axle and are clamped between an overlying tension plate 45 and a lower, inwardly-directed leg 46 of the clamping seat casting 31.

Since the multi-leaf spring means 20 is normally bowed with the leaves thereof each having a different radius of curvature, flexing of the spring means 20 and the changing of the bow is accompanied by individual and differential amounts of change in length in the various leaves of the spring means 20. Hence, it is desirable that the ends of the leaf springs 40 and 41 be free to move relative to one another between the tension plate 45 and the leg 46 of the shackle 31. That is, the leaves of the spring should not be clamped together so tightly that they cannot move relative to one another during flexure of the leaf spring assembly.

For the purpose of facilitating such sliding movement of spring leaves in response to the flexure of the spring means 20 as a whole, each of the clamping means 30 employs an interlocking spacer block 50, FIG. 8, between the upper tension plate 45 and the lower leg 46 of the axle seat casting 31. Thus, as nuts 52 on the respective threaded ends of a U-bolt 54 are tightened to bring the bight portion of the U-bolt into greater clamping pressure, the spacer block 50 serves to limit the amount of pressure which the tension plate 45 exerts on the ends of the springs 40 and 41 inserted between the tension plate 45 and the spring 36 to a pressure less than that pressure which would prevent endwise movement of the shorter spring.

The tension plate 45, as best seen in FIG. 2, has an upwardly turned rear portion 55 for seating the bight portion of the U-bolt 34 and a generally curved portion 56 having the same general curvature as the portion 38 of the spring 36 curved about the axle RA. Extending forwardly of the curved portion 56 is a flat retaining plate portion 57, the underside of which is in engagement with the leaf spring 40. The tension plate 45 is approximately as thick, FIG. 8, and as wide, FIG. 3, as one of the leaf springs of the multi-leaf spring means 20. The retaining plate 57 of the tension plate 45 is generally wedge-shaped and has two opposed, depending guide and confining finger portions 60 and 61 struck therefrom and bent downwardly to clasp the side edges of the leaf springs 40, 41 and 36. These guiding finger portions 60 and 61 confine the shorter leaves 40 and 41 against sliding transverse or sideways relative to one another and/or to the longer leaf spring 36. Thus, the plate 57 and finger portions 60 and 61 confine the leaf springs 40 and 41 to move longitudinally relative to one another as their respective radii of curvature change with the flexure of the spring means 20 as a whole.

The ends of the leaf springs 40 and 41 are also confined against lateral movement relative to one another and to the spring 36 by the upstanding opposed guiding walls 65 integrally formed on the forward leg 46 of the shackle 31.

In the preferred embodiment of the invention, illustrated in FIG. 4, each of the shackles 31 is welded to the associated axle RA or FA so as to be associated at a definite fixed angle with respect to the spring means 20. Thus, when securing the spring means 20 to the axle, the longest leaf 36 is placed with its curved axle-engaging portion 38 complementally against the axle FA or RA. Next, the spacer block 50 is placed on the spring 36 and axle seating means 31 with its appropriately curved middle portion 70, FIG. 8, placed against the upwardly curving portion 39 of the longest spring 36. Then, the tension plate 45 is placed over the spring means 20 with the guiding fingers 60 and 61 along the side edges of the spring leaves 40, 41 and 36. Then, the tension plate 45 is placed over the spring means 20 with the guiding fingers 60 and 61 along the side edges of the spring leaves 40, 41 and 36. The bights of the U-bolts 34 and 54 are then placed about the tension plate 45 in the positions shown and nuts 52 are tightened. The tension plate 45 is clamped at its outer end against the spring 36 at the rear portion of the axle clamp means 30, and clamped at the forward end against the assembled leaves 36, 40 and 41. The clamping of the springs 40 and 41 is with limited pressure, and the ends of these springs 40 and 41 are confined against separation from the clamping means 30 by being enclosed by the clamping means on three sides.

The interlocking spacer block 50 is shown in detail in FIGS. 9 and 12 inclusive, as having a central spacer block portion 72 spanning a pair of upstanding legs 75. The legs 75 are spaced apart at a distance approximately equal to the width of a leaf spring. The spacer block portion 72 is as thick as the combined thickness of leaf springs 40 and 41. The pair of upstanding legs 75 each have an L-shaped configuration with a short leg 76 and a longer leg 77, the longer leg extending longitudial of the spring means 20. As best seen in FIG. 2, the longer leg 77 extends rearwardly towards the axle (RA) and the shorter leg 76 extends normal to the spring means 20 and adjacent the upstanding portion 65 of the shackle 31. The spacer block portion 72 is spaced medially of the top surfaces 78 of the legs 76 and the bottom surfaces of the legs 76, FIG. 9. The leaf spring 36 is disposed beneath the spacer block 72 and between the legs 76, and the tension plate 45 is placed on the upper surface of the spacer block 72. As best seen in FIG. 8, the top of the tension plate 45 is spaced above the top surface 78 of the legs 76 so that the legs 76 do not limit the tightening of the U clamp 54 on the tension plate 45.

The spacer block 50 and shackle 31 are so designed that respective portions of the spacer block 50 and the shackle 31 are interlocked to prevent either transverse or longitudinal movement of the spacer block 50 relative to the shackle 31 due to flexure of the multi-leaf spring means. More specifically, the opposed guiding walls 65 integrally formed on the shackle 31 have outwardly diverging flanged portions 65a, FIGS. 2, 3 and 4, against which are abutted the short legs 76 of the spacer blocks 50 so that the respective spacer blocks 50 are prevented from moving inwardly of the spring means towards the support bracket 22.

As shown in FIG. 4, the interlocking spacer blocks 50 are seated within cavities or depressions therefor within the shackle 31. As best seen in FIG. 15, the L-shaped legs 75 at the opposite sides of the spacer block 50 are adapted to be seated in complementary shaped depressions 140, FIG. 15, in a shackle casting 31 or 142. The shackle casting 142 is the same as the shackle casting 31 of the preferred embodiment except that the shackle 142 does not have an upstanding rear plate 33 as does the shackle casting 31. As best seen in FIGS. 15 and 16, each of the complementary shaped grooves 140 consist of a longitudinally extending groove 144 disposed between riser portions 145 and 146 and an intersecting groove 148 extending normally outward to constitute an L-shaped groove 140 for an L-shaped leg 75 of the spacer block 50. Thus, with the spacer block 50 disposed in the proper position on the shackle 31, and with the smaller U-bolt 54 placed in position, the short leg 76 of the spacer block 50 is limited by the flange 65a of the shackle 31 against inward movement, and is limited by the U-bolt 54 against moving outwardly. In addition to the U-bolts 54, the spacer block 50 is prevented against traverse movement in the direction normal to the spring by the interlocking L-shaped grooves 140, in which are seated the L-shaped legs 75 of the spacer block 50.

The tension plate 45 is related to the spring means 20 and to an axle so as to advantageously make the tension plate 45 function as a counter spring, which is adapted to resist deleterious stressing and straining of the spring means 20 when the brake is applied. For example, if the trailer frame F is moving in the direction of the arrow DA, FIG. 4, when the brakes are applied, the friction between the road and the wheels tends to cause the axles RA and FA to rotate in a counter-clockwise direction, as seen in FIGS. 4 and 8, about the upstanding curved portion 39 of the leaf spring 36. Because the tension plate 45 is bound to the shackle 31 by the U-bolts 34 and 54, the tension plate 45 also will be subjected to being flexed about the projecting portion 57. In addition to resisting this bending force, the tension plate 45 also distributes the bending force due to the braking operation to the shorter leaves 40 and 41.

The flexing of one end of the spring means 20 due to bumps or depressions in the road articulates the spring means 20 about the trunnion mounting 80. In the particular suspension shown, considerable articulation of the axles FA and RA results since the axles are secured to thin end portions of a long multispring means 20 rather than medially at thicker portion of short semi-elliptical springs. The spring means 20 is journaled on a trunnion shaft 81 and is secured thereto by U-bolts 82 clamping the spring means between a top plate 84 and a trunnion saddle 85. The U-bolts 82 extend through apertures in the trunnion saddle 85 and apertures in the saddle cap 88, which cap joins the trunnion saddle 85 along a common parting line centrally of the trunnion shaft 81. By tightening the nuts 89 on the ends of the U-bolts 82, the top plate 84 tightly binds the spring means 20 against the trunnion saddle 85; and secures together the trunnion saddle 85 and trunnion saddle cap 88 to enclose the trunnion shaft 81. The plate 84, trunnion saddle 85, trunnion saddle cap 88 and U-bolts 82 constitute a shackle means for securing the spring means 20 to the trunnion shaft 81.

The trunnion shaft 81 is provided with the usual bushing 90 between the trunnion shaft 81 and the trunnion saddle 85 and saddle cap 88 so as to permit the spring means 20 to rotate as a whole in the manner of an equalizer beam about a fulcrum, the fulcrum being the trunnion shaft 81. The rotating of the spring means 20 as a whole about the trunnion shaft 81 permits the transposing of the load impressed upon one axle to the other axle so that both axles bear a portion of the load being impressed upon one axle due to a bump or depression encountered by the wheels of one axle. The trunnion shaft 81 is fixedly secured to the attaching bracket 22 in a well-known manner.

Figure 6:
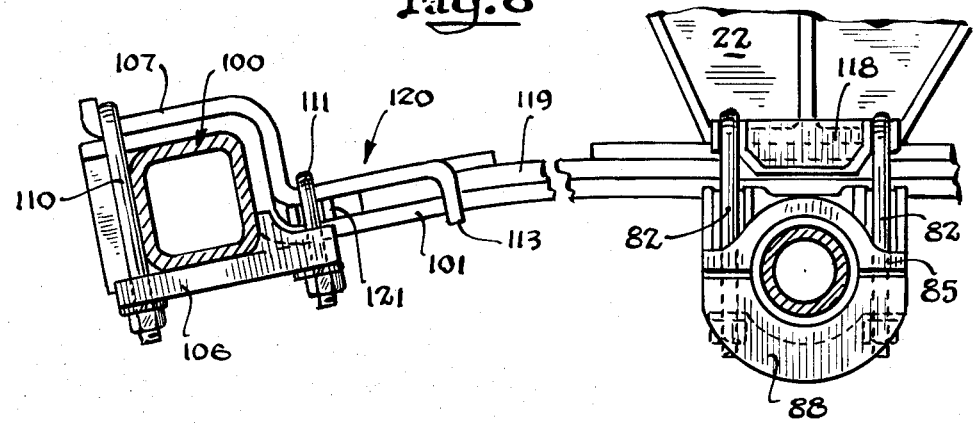
FIG. 6 is a side elevational view showing clamping of a multi-leaf spring to an axle according to another embodiment of the invention.
Figure 7:
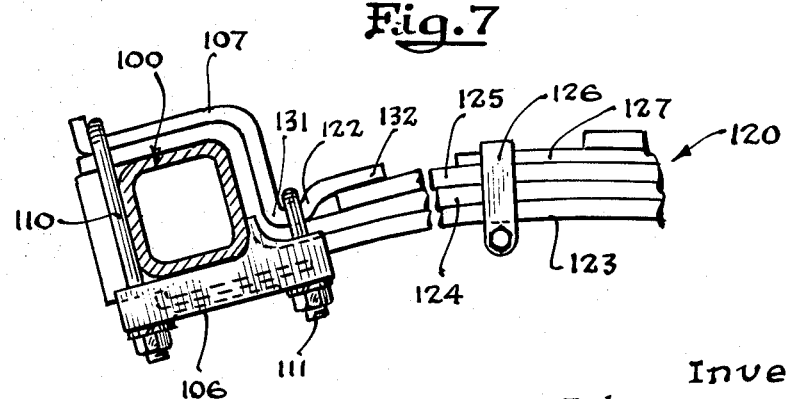
FIG. 7 is an elevational view showing the clamping of a multi-leaf spring to an axle according to another embodiment of the invention.

In the preferred embodiment of the invention, as hereinbefore described, both the axles FA and RA are round tubular axle tubes or shafts, while in other embodiments of the invention, shown in FIGS. 5, 6 and 7, the axle or axle tube 100 is square shaped in section.

In the embodiment shown in FIG. 5, a lower leaf spring 101 extends to the inward side of the axle 100, and then is bent at right angles along the inward side and again bent at the normal to overlie the top surface of the square shaped axle tube 100. The second longest leaf spring 104 extends over a leg 105 of an axle seat casting 106. A tension plate 107, which is of the same general configuration as the tension plate 45 except for a sharper curvature at curved portion 108, is secured by U-bolts 110 to clamp the springs 104 and 103 as well as the leaf spring 101 against the axle seat casting 106. The tension plate 107 has a pair of space dependent fingers 113 struck downwardly along the sides of the leaf springs to contain them, against lateral movement. Additionally, the tension plate 107 has a pair of spaced, upstanding ears 112 between which is positioned an auxiliary leaf spring 107. The auxiliary leaf spring 115 is secured by a top plate 118 to the remaining leaves of a multi-leaf spring means 120.

In the embodiment shown in FIG. 5, a spacer or block is not placed beneath the tension plate 107 to limit the tightening of U-bolt 110. However, as there is an open space between the tension plate 107 and the seat casting 106 at the U-bolt 110, leaf springs 104 and 101 are not clamped together so tightly as to prevent relative movement between the leaf springs 101 and 104 due to the differences in radii of curvature between the leaf springs when spring means 120 is undergoing flexure.

In the embodiment of the invention shown in FIG. 6, a square shaft or axle 100 is seated on the axle seat 106, and is secured thereto by U-bolts 110 and 111 clamping the tension plate 107 about axle 100 and to a leaf spring 101, and to a shorter leaf spring 119. Leaf spring 119 is clamped with its outer end free for sliding movement relative to the longest leaf spring 101 and tension plate 107. A spacer block 121 is disposed between the tension plate 107 and the longest leaf spring 101. The downwardly struck fingers 113 on the tension plate 107 confine spring 119 against lateral movement while leaving the spring 119 free to extend and contract as the load on axle 100 varies to make the spring means 120 change its shape.

In the embodiment shown in FIG. 7, the lower-most spring 123 extends completely beneath the axle 100 and is disposed in a recess therefor in the axle seat 106. The second lower spring 124 is curved upwardly and then is curved across the top of the axle 100. A tension plate 107 is provided with a U-shaped seat portion 131 resting on leaf spring 124 and with an inwardly and upwardly spaced clamping plate portion 132 in clamping engagement with a short leaf spring 125. The U-bolts 110 and 111 serve to clamp the lower spring 123 between the bottom surface of the axle 100 and axle seat 106; and through tension plate 107 to clamp the leaf spring 124 to the top surface of the axle 100. Thus, leaf springs 123 and 125 are permitted to slide relative to spring 124 as the multi-leaf spring means 120 flexes as a whole. A retaining clamp 126 encircles leaf springs 123, 124, 125 and 127 in the conventional manner to bind a leaf 127 to the leaves 123, 124 and 125.

In the embodiment of the invention shown in FIGS. 13–16, inclusive, the shackle 142 is identical to the shackle 142 is identical to the shackle 31 of the preferred embodiment, and is identical to the shackle 106 of the embodiment of FIGS. 6 and 7, except that the shackle 142 lacks a rearward upstanding wall 33 against which the end of the longest spring and tension plate are secured by the U-bolt 34. In accordance with the embodiment of the invention of FIGS. 13–16, inclusive, the lower and longest spring plate or leaf 150 is seated in engagement with the forward portion 151 of the shackle 142, and then continues in a curved portion 153 upwardly to wrap about the axle RA. It should be noted that the longest spring leaf 150 in this embodiment of the invention terminates in a curved portion wrapped about the axle RA, whereas in the embodiments of the invention heretofore described, the longest leaf spring 36 terminated in a straight portion 35 adapted to be secured in engagement with the top surface 37 of the upstanding wall of the shackle 31 or 106.

The multi-leaf spring means 20 is secured to the axle RA in this embodiment of the invention by the shackle 142 and a tension plate 160, which in turn are secured to the axle RA by the spaced U-bolt fasteners 34 and 54. The tension plate 160 is formed with an outer and upwardly curved end portion 161, which receives the bight of the U-bolt fastener 34, which, when the nuts are tightened causes the tension plate 160 to wrap tightly the curved portion 153 of the spring means 36 about the axle RA. The tension plate 160 has a retaining plate portion 167 overlying a pair of shorter leaves or spring plates 168 and 169 of the multi-leaf spring means 20 to distribute the load over these shorter leaf springs 168 and 169, while permitting these shorter leaves to move relative to one another as the multi-leaf spring means 20 undergoes a flexing movement. The retaining plate portion 167 is clamped against the spring leaves 168 and 169 by the U-bolt fastener 54 which also forces the tension plate against the top of a spacer block 50 disposed between the tension plate 160 and the longest spring leaf 150. As hereinbefore explained, the spacer block 50 is constrained against either lateral or longitudinal movement by the bottom portions of the L-shaped legs 75 of the spacer block 50 being disposed in L-shaped grooves 140 in the shackle 142.

In the previous embodiments of the invention heretofore described, the tension plates have been formed with depending ears or fingers for guiding the shorter spring leaves such as the spring leaves 168 and 169. However, it should be noted that in the embodiment of the invention of FIGS. 13–16, inclusive, that the tension plate 160 is formed without such depending ears or guiding fingers. As heretofore explained, the short leaf springs 168 and 169 extended into the shackle and terminate adjacent the spacer block 50. Thus, the terminal ends of the short leaf springs 168 and 169 are disposed between upstanding side walls 65 integrally formed on the forward portion of the shackle 142. Thus, the side walls 65 constrain the shorter leaves 168 and 169 against any transverse movement relative to the shackle 142.

From the foregoing, it will be seen that the present invention is characterized at each side of the trailer, by a single, semi-elliptical, multi-leaf spring as the sole support for the ends of tandem axles. It will also be seen that the tandem axles are supported by a plurality of the leaves of the multi-leaf spring means, while permitting these supporting leaf springs to move relative to one another due to the respective differences in curvature of the various leaf springs. By affording a clamping means 30 employing a uniquely shaped tension plate 45, the leaves of the spring support an axle and are enabled to move relative to one another as is necessary because of the differences of their respective changing radii of curvature. The amount of frictional gripping force on the shorter leaf springs is limited by spacing blocks so as not to bind these shorter leaf springs together in such a manner that they cannot move relative to one another.

Additionally, the tension plate 45 serves as a counter spring means capable of resisting bending forces generated when the brakes are applied that would tend to rotate the axles RA and FA about their interconnections with the multi-leaf spring means. Moreover, fingers 60 and 61 struck from the tension plate 45 restrict the sideways movement of the shorter springs to that in the longitudinal direction of the spring means 20; and cooperate with the retaining portion 57 of the tension plate 45 to confine the shorter springs.

Hence, while preferred embodiments of the invention have been described and illustrated, it is to be understood that they are capable of variation and modification, as for example by reversing the juxtaposition of the spring ends relative to the axles, and I therefore do not wish to be limited to the precise details set forth, but desire to avail myself of such changes and alterations as fall within the purview of the following claims.

I claim:

1. In a tandem suspension for trucks or the like for suspending front and rear wheel carrying axles beneath the frame of the truck, a bracket means adapted to be secured to said frame, a leaf spring means secured to said bracket and having a forwardly extending portion extending toward one of said wheel carrying axles and a rearwardly extending portion extending toward the other of said axles, said leaf springs serving as the sole support for said axles, securing means adapted to secure each of said forwardly and rearwardly extending portions of said leaf spring means to said axles, and confining means on said securing means adapted to confine said spring means against a disassociating movement with its associated axle while permitting said spring means to slide relative to said axle means as said springs expand and contract in response to rotational movement of said axles, said leaf spring means having the longest leaf spring with its end portions shaped complementally in direct embracing relation to portions of said axles, and a plurality of shorter leaf springs confined by said confining means for supporting said axles.

2. In a tandem suspension for a tandem axle, vehicle, bracket means adapted to be secured to the frame of the vehicle to depend therefrom, means affording trunnion supports secured to the bracket means and said supports being on a pre-determined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their midpoints to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, and a tension plate for clamping each of the spring and extensions to the related axle and including a portion effective to clamp the shorter ones of the leaf springs to the leaf spring having the end extensions.

3. In a tandem suspension for a tandem axle vehicle, bracket means adapted to be secured to the frame of the vehicle to depend therefrom, means affording trunnion supports secured to the bracket means and said supports being on a pre-determined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their midpoints to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extensions, and an axle seating means adapted to be disposed on each of said axles and located on said axle opposite the extension of said one of said leaf springs and opposite said tension plate whereby said axle seating means and said tension plate can be secured together to clamp said axle to said spring means.

4. In a tandem suspension for a tandem axle vehicle, bracket means adapted to be secured to the frame of the vehicle to depend therefrom, means affording trunnion supports secured to the bracket means and said supports being on a predetermined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their mid-points to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extensions, an axle seating means adapted to be disposed on each of said axles and located on said axle opposite the extension of one of said leaf springs and opposite said tension plate whereby said axle seating means and said tension plate can be secured together to clamp said axle to said spring means, and spacer means adapted to be disposed between said axle seating means and said tension plate, said spacer means limiting the compression force being exerted on the ends of the remaining leaf springs so that the remaining leaf springs may slide relatively to each other and to said one leaf spring.

5. In a tandem suspension for a tandem axle vehicle, bracket means adapted to be secured to the frame of the vehicle to depend therefrom, means affording trunnion supports secured to the bracket means and said supports being on a predetermined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their midpoints to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extensions, an axle seating means adapted to be disposed on each of said axles and located on said axle opposite the extension of one of said leaf springs and opposite said tension plate whereby said axle seating means and said tension plate can be secured together to clamp said axle to said spring means, said tension plate being curved to embrace the shaped portion of said extension on said one leaf spring and having a portion extending toward said trunnion support and in engagement with said ends of said remaining leaf springs, and fastener means adapted to be disposed on opposite sides of said axle and adapted to clamp said extension of said one leaf spring, said ends of said remaining leaf springs and said axle between said axle seating means and said tension plate.

6. In a tandem suspension for a tandem axle vehicle, bracket means adapted to be secured to the frame of the vehicle to depend therefrom, means affording trunnion supports secured to the bracket means and said supports being on a predetermined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their mid-points to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extensions, an axle seating means adapted to be disposed on each of said axles and located on said axle opposite the extension of one of said leaf springs and opposite said tension plate whereby said axle seating means and said tension plate can be secured together to clamp said axle to said spring means, and vertically extending portions on said tension plate adapted to be disposed adjacent the side edges of said leaves of said leaf springs to confine said leaf springs against sliding transverse to one another while permitting said leaf springs to slide longitudinally to one another.

7. In a tandem suspension for a tandem axle vehicle, bracket means adapted to be secured to the frame of the vehicle to depend therefrom, means affording trunnion supports secured to the bracket means and said supports being on a predetermined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their mid-points to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extensions, an axle seating means adapted to be disposed on each of said axles and located on said axle opposite the extension of one of said leaf springs and opposite said tension plate whereby said axle seating means and said tension plate can be secured together to clamp said axle to said spring means, said tension plate being made from a spring metal plate and adapted to be secured to said axle seating means and said spring means so as to flex as a counter spring resisting the stressing of the spring means in response to a braking operation of said vehicle.

8. In a tandem suspension for a tandem axle vehicle, bracket means adapted to be secured to the frame of the vehicle to depend therefrom, means affording trunnion supports secured to the bracket means and said supports being on a predetermined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their mid-points to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extension, an axle seating means adapted to be disposed on each of said axles and located on said axle opposite the extension of one of said leaf springs and opposite said tension plate whereby said axle seating means and said tension plate can be secured together to clamp said axle to said spring means, said tension plate is made from spring metal having substantially the thickness and the width of one of said leaves of said spring means.

9. In a tandem suspension for a tandem axle vehicle, bracket means adapted to be secured to the frame of the vehicle to depend therefrom, means affording trunnion supports secured to the bracket means and said supports being on a predetermined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their mid-points to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extensions, an axle seating means adapted to be disposed on each of said axles and located on said axle opposite the extension of one of said leaf springs and opposite said tension plate whereby said axle seating means and said tension plate can be secured together to clamp said axle to said spring means, a spacer block having legs with a centrally disposed body portion, said spacer block disposed between said tension plate and said one of said leaf springs with said legs resting on said axle seating means; and U-bolt means adapted to be secured on opposite sides of said axle to clamp said tension plate and said axle seat to secure said spring means to said axle.

10. In a tandem suspension for a tandem axle vehicle, bracket means adapted to be secured to the frame of the vehicle to depend therefrom, means affording trunnion supports secured to the bracket means and said supports being on a predetermined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their mid-points to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extensions, an axle seating means adapted to be disposed on each of said axles and located on said axle opposite the extension of one of said leaf springs and opposite said tension plate whereby said axle seating means and said tension plate can be secured together to clamp said axle to said spring means, and an auxiliary leaf spring means extending across the tension plate and said axle means to provide an additional biasing force against movement of said axle means due to the load impressed on said axle.

11. In a tandem suspension for a tandem axle vehicle, bracket means adapted to be secured to the frame of the vehicle to depend therefrom, means affording trunnion supports secured to the bracket means and said supports being on a predetermined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their mid-points to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extensions; an axle seating means adapted to be disposed on each of said axles and located on said axle opposite the extension of one of said leaf springs and opposite said tension plate whereby said axle seating means and said tension plate can be secured together to clamp said axle to said spring means, a leaf of said leaf spring being disposed across said axle seating means opposite said extension of said one leaf spring, and clamping means for clamping said springs and said tension plate against said axle means.

12. In a tandem suspension for a tandem axle vehicle, bracket means adapted to be secured to the frame of the vehicle to depend therefrom, means affording trunnion supports secured to the bracket means and said supports being on a predetermined axis beneath the vehicle frame when the bracket means is secured to the vehicle frame, a pair of elongated spring means adapted to be connected at the ends thereof to the ends of the related axles of the vehicle at the opposite sides of the vehicle, shackle means for connecting said spring means substantially at their mid-points to said supports for pivotal movement about said horizontal axis as an incident to loads imposed on the axles tending to pivot the spring means, said spring means each comprising a plurality of leaf springs superimposed on one another, one of the leaf springs for each spring means including extensions at the opposite ends thereof shaped to embrace at least a portion of the end of each of the related axles, at least one of the remaining leaf springs having an end terminating short of the axles when the spring means are connected thereto and adapted to move lengthwise relative to the axles and relative to the leaf spring having the end extensions upon flexure of the spring means as a whole when loads are imposed on the axles, a tension plate for clamping each of the spring and extensions to the related axle and including a portion effective to clamp the shorter ones of the leaf springs to the leaf spring having the end extensions, an axle seating means adapted to be disposed on each of said axles and located on said axle opposite the extension of one of said leaf springs and opposite said tension plate whereby said axle seating means and said tension plate can be secured together to clamp said axle to said spring means, and spacer means adapted to be disposed between said axle seating means and said tension plate, said spacer means limiting the compression force being exerted on the ends of the remaining leaf springs so that the remaining leaf springs may slide relatively to each other and to said one leaf spring, said spacer means having portions thereof seated in complemental grooves in said axle seating means so that said spacer means is interlocked against movement relative to axle seating means.

References Cited by the Examiner

UNITED STATES PATENTS 2,012,752  8/1935  Buquor _____ 280—104.5
2,284,646  6/1942  Bidal _____ 280—104.5 X
2,413,910  1/1947  Diard _____ 280—104.5

BENJAMIN HERSH, *Primary Examiner.*

MILTON BUCHLER, *Examiner.*